May 15, 1934.    W. F. BENNING    1,958,562
BASKET HANDLE
Filed Jan. 31, 1931
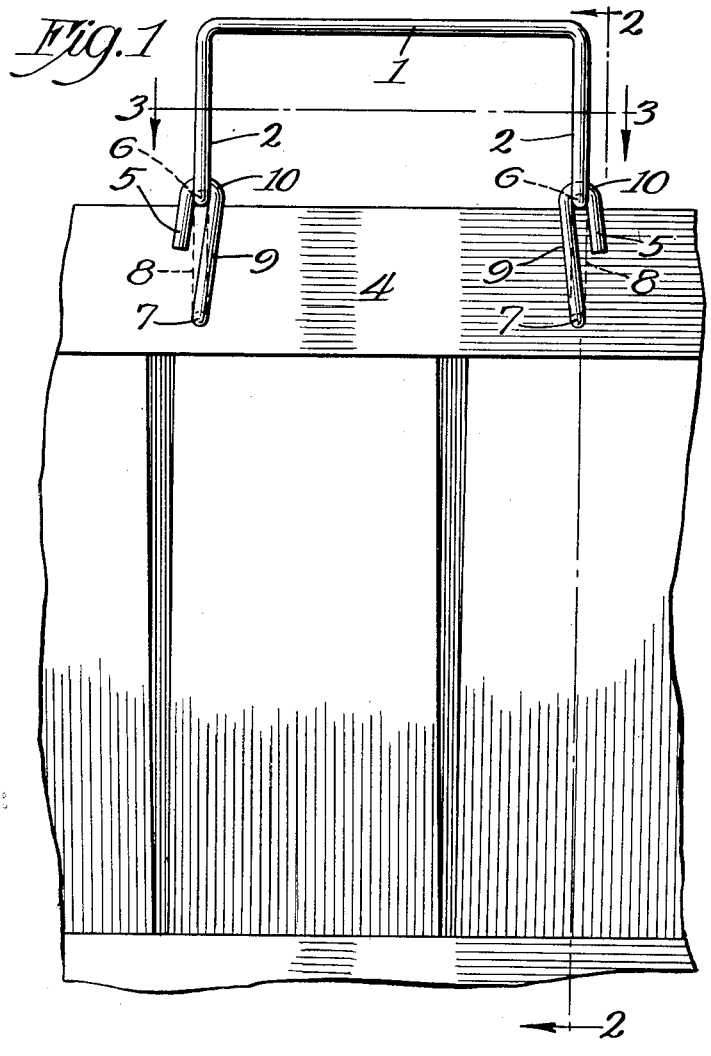
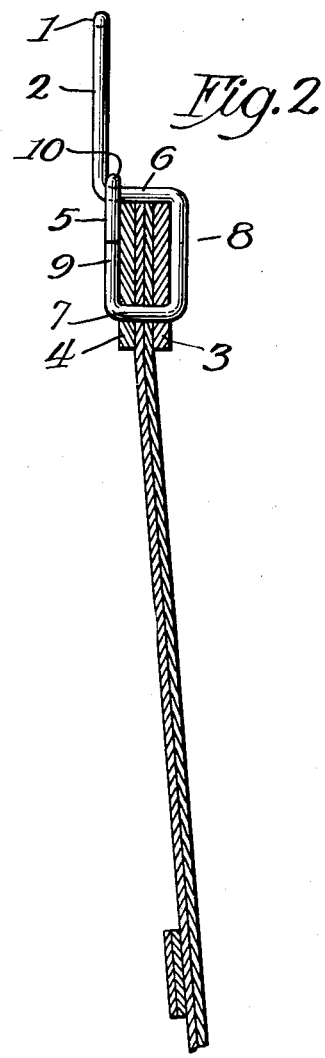
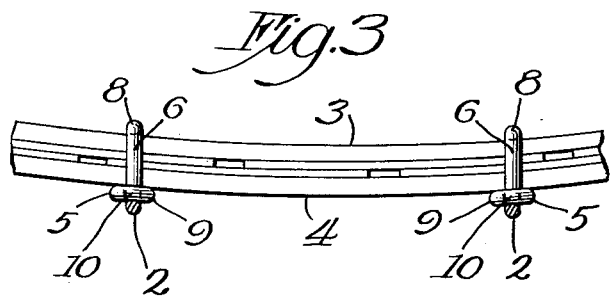
Inventor
W. F. Benning
By Arthur F. Durand
Atty.

Patented May 15, 1934

1,958,562

UNITED STATES PATENT OFFICE 1,958,562

BASKET HANDLE

William F. Benning, Benton Harbor, Mich.

Application January 31, 1931, Serial No. 512,547

5 Claims. (Cl. 217—125)

This invention relates to basket handles, or handles for other receptacles, of the kind comprising a length of wire bent into bail shape and having its two lower end portions suitably attached to the rim of the basket or other receptacle.

Generally stated, the object of the invention is to provide an improved construction and novel arrangement whereby a handle of this kind is effectively fastened in place by means of end portions of the handle, such end portions being inserted outwardly through the rim of the basket or other receptacle, and there being a downwardly bent outside end for each end portion of the bail-shaped handle.

It is also an object to provide certain details and features of construction and combinations tending to increase the general efficiency and the desirability of a basket handle of this particular character.

To the foregoing and other useful ends, the invention consists in matters hereinafter set forth and claimed and shown in the accompanying drawing, in which—

Fig. 1 is a side elevation of a basket handle embodying the principles of the invention, showing the adjacent portions of the basket or other receptacle to which the handle is attached;

Fig. 2 is a vertical section on line 2—2 in Fig. 1 of the drawing;

Fig. 3 is a horizontal section on line 3—3 in Fig. 1 of the drawing.

As thus illustrated, the invention comprises a wire handle having a horizontal top portion 1 and vertically disposed side portions 2, these side portions being formed with end portions which are inserted outwardly through the inner and outer hoops 3 and 4 of the basket or other receptacle, and which are then bent up and over and down to provide outer downwardly bent portions 5, as shown. In this way, the handle is bail-shaped in general form, and is provided with hook-shaped depending side portions that are hooked through the rim of the basket or other receptacle in the manner shown and described.

To firmly attach the handles in place, each handle has horizontal portions 6 in position to rest on the top of the basket rim, and the lower portions 7 that pierce the hoops, and inner portions 8 that rest against the inner hoop.

In this way, it will be seen, the operation of forming and inserting the handle itself is performed from the inside of the basket or receptacle, so that the wire ends of the handle are inserted outwardly through the rim of the basket or receptacle, and the end portions are then bent up and over and down, as shown.

With the foregoing construction and arrangement, the handle is firmly anchored in the receptacle, and is not liable to be forced or bent away from the side of the receptacle, such distortion of the handle being resisted by the position and formation of the handle wire itself. Preferably, as shown, the portions 7 are disposed a substantial distance below the upper edge of the rim of the basket or receptacle, thus reducing the danger of breakage of the hoop when outward pressure is brought against the handle, tending to pull out the ends. But with the construction shown and described, which is illustrative of the invention, the handles are not liable to become detached, and are so firmly anchored that they are not liable to pull out, for the portions 6, 7, 8 and 9 form strong gripping means between the inner and outer sides of the rim.

A basket cover will rest on the portions 6 of the handles. This will tend to keep the handle from pulling the portions 6 upward, when the basket is lifted. The curved engaging portions 10 bear upon the portions 6 and hold the latter down. The wire end portions 5 are outside and flat against the outer side of the rim. The portions 5, 9 and 10 form hooks that keep the portions 6 from being pulled up when the basket is lifted by the handles.

It will be seen that the side portions 2 of the handle are substantially vertical, and when viewed as in Fig. 2 of the drawing, are in the vertical plane of the outer side of the rim of the basket. In this way, some engaging portions extend under other engaging portions to engage the top of the rim, while other engaging portions of the handle engage the outer and inner sides of the rim, and extend through the rim, forming a very strong attachment of the handle to the basket or other receptacle.

The portions 8, 9, and 10 form inverted U-shaped members, each having sides of unequal length. Also, the portions 7 are preferably in the parallel vertical planes of the portions 6, the sides 2 of the handle being in said planes.

What I claim as my invention is:

1. A handle for a receptacle, constructed by inserting and bending wire on the rim of the receptacle, comprising a length of wire bent into bail shape and provided with inwardly bent horizontal upper portions resting on the upper edge of the rim, upon which a cover will rest, lower portions inserted outwardly through the rim of the receptacle, and having a plurality of bent engaging portions for each side of the handle, one bent portion at each side extending upwardly outside and being bent into hook form and hooked over a horizontal wire portion on the upper edge of the rim, with the hook thus formed resting against the outer side of the rim, and other bent portions extending vertically inside between said upper and lower portions.

2. A wire handle constructed on a basket rim by the bending of the wire into bail shape and inserting the wire ends outwardly through the basket rim, with portions of the wire bent horizontally upon the top of the basket rim, to position the handle at the outer side of the rim, bending the outer wire ends upwardly against the basket rim and over the outer ends of the horizontal portions of the wire resting on the top of the rim and then downwardly against the outer side of the rim, forming two inserted hooks with downturned ends, said hooks resting flatwise against the outer side of the rim, with the curved top portion of each hook bearing against the adjacent lower end portion of the adjacent upstanding side portion of the handle, whereby the shanks and ends of the hooks are pulled more tightly against the outside of the basket rim by the upward pull on the handle when the basket is loaded and lifted by the handles.

3. A structure as specified in claim 2, including the bending of the wire ends away from each other, over said horizontal wire portions, before finally bending the wire ends downwardly against the outer side of the rim, whereby the shanks of the hooks incline toward each other.

4. A structure as specified in claim 2, said hooks forming inverted U-shaped wire portions each having parallel sides of unequal length.

5. A structure as specified in claim 2, the points of insertion of the wire through the rim being in the parallel vertical planes of the two horizontal portions.

WILLIAM F. BENNING.